US009123977B2

(12) United States Patent
Nishikawa et al.

(10) Patent No.: US 9,123,977 B2
(45) Date of Patent: Sep. 1, 2015

(54) CHARGE STOP POINT DETECTING METHOD, CHARGE STOP POINT DETECTING DEVICE, AND A BATTERY PACK

(75) Inventors: Toru Nishikawa, Sumoto (JP); Shinichi Matsuura, Sumoto (JP)

(73) Assignee: SANYO ELECTRIC CO., LTD., Osaka (JP)

( * ) Notice: Subject to any disclaimer, the term of this patent is extended or adjusted under 35 U.S.C. 154(b) by 589 days.

(21) Appl. No.: 13/445,082

(22) Filed: Apr. 12, 2012

(65) Prior Publication Data

US 2012/0268059 A1      Oct. 25, 2012

(30) Foreign Application Priority Data

Apr. 22, 2011   (JP) .................................. 2011-96284

(51) Int. Cl.
 *H02J 7/00*       (2006.01)
 *H01M 10/44*      (2006.01)
(52) U.S. Cl.
 CPC ............. *H01M 10/44* (2013.01); *H02J 7/0021* (2013.01); *H02J 7/0026* (2013.01); *H02J 7/0077* (2013.01); *H02J 2007/0039* (2013.01)
(58) Field of Classification Search
 USPC ................................................. 320/127, 137
 See application file for complete search history.

(56) References Cited

U.S. PATENT DOCUMENTS

| | | | | |
|---|---|---|---|---|
| 5,650,712 A * | 7/1997 | Kawai et al. | ................... | 324/427 |
| 6,198,254 B1 * | 3/2001 | Satake et al. | ................... | 320/132 |
| 6,756,767 B2 * | 6/2004 | Kawai | ........................... | 320/125 |
| 2002/0195996 A1 * | 12/2002 | Nakatsuji | ...................... | 320/127 |
| 2007/0170892 A1 * | 7/2007 | Ishii | ............................. | 320/132 |

FOREIGN PATENT DOCUMENTS

JP            2002-325363              11/2002

* cited by examiner

*Primary Examiner* — Drew A Dunn
*Assistant Examiner* — Zixuan Zhou
(74) *Attorney, Agent, or Firm* — Wenderoth, Lind & Ponack, L.L.P.

(57) ABSTRACT

After the highest voltage of a rechargeable battery becomes higher than 4.0 V, when the charging current keeps lower than 50 mA for 20 seconds, a first point is detected for stopping charging the battery. Also, after the highest voltage becomes higher than 4.0 V, the charged capacity value and the discharged capacity value are added and subtracted for integrating the charged/discharged capacity if the highest voltage keeps higher than the integration start voltage. When the integration result shows that the battery is charged totally after the highest voltage becomes higher than 4.0 V, and when the absolute value of the integration result becomes larger than 50% of the designed capacity of the battery, the point second is detected for stopping charging the battery.

7 Claims, 4 Drawing Sheets

CHARGE STOP POINT DETECTING METHOD, CHARGE STOP POINT DETECTING DEVICE, AND A BATTERY PACK

BACKGROUND OF THE INVENTION

1. Field of the Invention

The present invention relates to a charge stop point detecting method, charge stop point detecting device, and a battery pack which detect the point for stopping charging a rechargeable battery based on capacity charged/discharged to/from the rechargeable battery.

2. Description of the Related Art

Conventional rechargeable batteries, typically lithium ion batteries, are charged typically by so-called constant-current/constant-voltage charging operation. In the constant-current/constant-voltage charging operation, the rechargeable batteries are first charged in a constant-current charging manner, and are then charged in a constant-voltage charging manner, in other words, the charging operation is switched from the constant-current charging manner to the constant-voltage charging manner, when the terminal voltage (hereinafter, occasionally referred to as battery voltage) reaches predetermined voltage which is previously set lower than the maximum rated voltage available to charge the rechargeable batteries. In the constant-current charging manner, the rechargeable batteries are charged at predetermined constant current. In the constant-voltage charging manner, the rechargeable batteries are charged at a constant voltage. If the battery voltage of a battery exceeds the maximum voltage, this may cause deterioration of the life and charge/discharge capacity of the battery. Also, the battery may catch fire. For these reasons, the battery is charged with the battery voltage being adjusted under the maximum voltage.

A full charge capacity (FCC) value of a rechargeable battery is updated every cycle of the charging/discharging operation based on the integrated value of the discharging current of the rechargeable battery which is discharged to discharge stop voltage (learning point voltage) after the rechargeable battery is fully charged. The remaining capacity of the rechargeable battery after being charged is calculated by subtracting the integrated value of charging/discharging current (charging current and discharging current) from FCC updated immediately before this calculation. In this integration, the discharging direction is defined positive. The charging/discharging current is detected by the voltage drop produced by a current detection resistor which is connected on the charging/discharging path of the rechargeable battery. However, it is difficult to detect the charging/discharging current within the range between about ±5 mA. For example, when a leak current flows from the rechargeable battery into a system such as external electric device, if this leak current cannot be detected as discharging current, FCC is updated to capacity smaller than the actual FCC. Accordingly, the remaining capacity is also calculated at capacity smaller than the actual capacity.

On the other hand, when a rechargeable battery is charged, if it is not detected that the rechargeable battery is fully charged for some reason, the rechargeable battery may be charged higher than the rated charge capacity. In this case, the rechargeable battery may be overheated, and may accidentally catch fire or explode.

In order to prevent this, technologies has been developed to monitor the charge capacity and to detect abnormalities in charging operation.

For example, Japanese Laid-Open Patent Publication No. JP 2002-325,363 A discloses a trouble checking method and a battery pack which calculates the capacity or the remaining capacity during charging operation of a rechargeable battery, and determine whether the calculated capacity exceeds substantially 1.5 to 2 times the rated capacity or learning capacity whereby checking trouble in the rechargeable battery and a charge control system.

However, in the technology disclosed in JP 2002-325,363 A, when the calculated FCC or capacity is smaller than the actual capacity as discussed above, it may be determined that trouble occurs in the rechargeable battery or the charge control system even if the rechargeable battery is properly charged.

The present invention is aimed at solving the problem. It is an object of the present invention to provide a charge stop point detecting method, a charge stop point detecting device, and a battery pack which can properly decide to stop charging a rechargeable battery even if calculated charged capacity or calculated remaining capacity is deferent from the actual capacity.

SUMMARY OF THE INVENTION

A charge stop point detecting method according to the present invention detects the point for stopping charging a rechargeable battery based on integrated capacity. The integrated capacity is obtained by integrating charged/discharged capacity based on charging/discharging current of the rechargeable battery. The charging/discharging current of the rechargeable battery is sequentially detected. In this method, the voltage of the rechargeable battery is sequentially detected. Charged/discharged capacity is integrated by adding/subtracting the charged capacity and the discharged capacity if the detected voltage is higher than predetermined voltage. It is determined whether the absolute value of the integrated capacity is greater than predetermined capacity if the integration result shows that the rechargeable battery is totally charged. The point for stopping charging the rechargeable battery is detected when the absolute value becomes greater than the predetermined capacity.

In a charge stop point detecting method according to the present invention, the voltage and the charging/discharging current of a rechargeable battery are sequentially detected. A first point is detected when the detected voltage is higher than predetermined voltage and when the detected charging current keeps smaller than predetermined current for predetermined time. Charged/discharged capacity is integrated based on the detected charging/discharging current. A second point is detected based on the integrated capacity. The second point is different from the first point. It is decided to stop charging the rechargeable battery when any of the first and second points is detected. If the detected voltage is higher than voltage for detecting the first point, charged/discharged capacity is integrated by adding/subtracting the charged capacity and the discharged capacity. If the integration result shows that the rechargeable battery is totally charged, it is determined whether the absolute value of the integrated capacity is greater than predetermined capacity. The second point is detected when the absolute value becomes greater than the predetermined capacity.

In a charge stop point detecting method according to the present invention, the predetermined capacity can be previously set at a predetermined ratio relative to the total capacity available to charge the rechargeable battery.

In a charge stop point detecting method according to the present invention, the predetermined ratio can fall within the range of 40% to 60%.

A charge stop point detecting device according to the present invention detects the point for stopping charging a rechargeable battery based on integrated capacity. The integrated capacity is obtained by integrating charged/discharged capacity based on charging/discharging current of the rechargeable battery. The charging/discharging current of the rechargeable battery is sequentially detected. The device includes a detecting portion that sequentially detects the voltage of the rechargeable battery. If the voltage detected by the detecting portion is higher than predetermined voltage, charged/discharged capacity is integrated by adding/subtracting the charged capacity and the discharged capacity. The device further includes a determining portion that determines whether the absolute value of the integrated capacity is greater than predetermined capacity, if the integration result shows that the rechargeable battery is totally charged.

A charge stop point detecting device according to the present invention sequentially detects the voltage and the charging/discharging current of a rechargeable battery. The device can detect a first point when the detected voltage is higher than predetermined voltage and when the detected charging current keeps smaller than predetermined current for predetermined time. The device also integrates charged/discharged capacity based on the detected charging/discharging current. The device also detects a second point that is different from the first point based on the integrated capacity. The device also decides to stop charging the rechargeable battery when any of the first and second points is detected. If the detected voltage is higher than voltage for detecting the first point, charged/discharged capacity is integrated by adding/subtracting the charged capacity and the discharged capacity. The device includes a determining portion that determines whether the absolute value of the integrated capacity is greater than predetermined capacity, if the integration result shows that the rechargeable battery is totally charged.

In a charge stop point detecting method according to the present invention, the predetermined capacity can be previously set at a predetermined ratio relative to the total capacity available to charge the rechargeable battery.

In a charge stop point detecting method according to the present invention, the predetermined ratio can fall within the range of 40% to 60%.

A battery pack according to the present invention includes the aforementioned charge stop point detecting device, and one rechargeable battery or a plurality of rechargeable batteries to stop being charged when the point for stopping charging the rechargeable battery or batteries is detected by this charge stop point detecting device.

According to the present invention, after the sequentially detected voltage of the rechargeable battery becomes higher than predetermined voltage, charged/discharged capacity is integrated by adding/subtracting the charged capacity and the discharged capacity if the sequentially detected voltage of the rechargeable battery keeps higher than the predetermined voltage. When the integration result shows that the rechargeable battery is totally charged after the sequentially detected voltage of the rechargeable battery becomes higher than the predetermined voltage, and when the absolute value of the integration result becomes larger than predetermined capacity, the point is detected for stopping charging the rechargeable battery.

That is, the capacity integration does not start until the battery voltage reaches the predetermined voltage. After the battery voltage reaches the predetermined voltage, the integrated capacity is obtained by subtracting the discharged capacity from the charged capacity. When the integrated capacity becomes higher than the predetermined capacity, the point is detected for stopping charging the rechargeable battery. Therefore, the point can be accurately detected for stopping charging the rechargeable battery irrespective of the capacity which is charged until the battery voltage reaches the predetermined voltage.

Also, according to the present invention, after the voltage of the rechargeable battery becomes higher than the predetermined voltage, if the charging current keeps lower than a predetermined amount of current for predetermined time, the point is detected as the first point for stopping charging the rechargeable battery. Also, if the voltage of the rechargeable battery keeps higher than the predetermined voltage for detecting the first point, the charged capacity and the discharged capacity are added and subtracted for integrating the charged/discharged capacity. When the integration result shows that the rechargeable battery is totally charged after the voltage of the rechargeable battery becomes higher than the predetermined voltage, and when the absolute value of the integration result becomes larger than the predetermined capacity, the point is detected as the second point for stopping charging the rechargeable battery.

That is, after the battery voltage reaches the voltage equivalent to the full-charge detection start voltage, the integrated capacity is obtained by subtracting the discharged capacity from the charged capacity. When the integrated capacity becomes higher than the predetermined capacity, the second point is detected for stopping charging the rechargeable battery. As a result, the second point for stopping charging the rechargeable battery can be detected irrespective of the capacity which is charged until the rechargeable battery is brought to a state near the fully charged state. Therefore, it is possible to improve the accuracy for detecting the second point. In addition, even if the first point cannot be detected, it is possible to detect the second point.

Also, according to the present invention, the predetermined capacity is set to a predetermined ratio of the capacity which is previously specified as the total capacity available to charge the rechargeable battery (e.g., designed capacity).

Therefore, it is possible to detect the second point for stopping charging the rechargeable battery independent of variable capacity.

According to the present invention, the predetermined capacity can be adjusted lower/higher within a range of 40% to 60% of the designed capacity, for example, in accordance with higher/lower temperature to be expected in use of the rechargeable battery.

If the predetermined capacity is set smaller than 40% of the designed capacity, in the case where the rechargeable battery is used in ordinary temperature or high temperature, the second point may be detected before the first point is detected. If the predetermined capacity is set larger than 60% of the designed capacity, the delay time may be unnecessarily increased until the second point is detected after the first point is detected.

Also, according to the present invention, the aforementioned charge stop determining device can detect the point for stopping charging the rechargeable battery.

Accordingly, the battery pack can be provided with the charge stop determining device which can adequately detect the point for stopping charging the rechargeable battery, even if the calculated charged capacity or the calculated remaining capacity is different from the actual charged capacity or the actual remaining capacity.

According to the present invention, the capacity integration does not start until the battery voltage reaches the predetermined voltage. Even if the integrated charged capacity is smaller than the actually charged capacity, such error does not affect this capacity integration after the battery voltage reaches the predetermined voltage. When the integrated capacity becomes higher than the predetermined capacity, the point is detected for stopping charging the rechargeable battery. Therefore, the point can be accurately detected for stopping charging the rechargeable battery irrespective of the capacity which is charged until the battery voltage reaches the predetermined voltage.

As a result, even if the calculated charged capacity or the calculated remaining capacity is different from the actual charged capacity or the actual remaining capacity, the point can be adequately detected for stopping charging the rechargeable battery.

The above and further objects of the present invention as well as the features thereof will become more apparent from the following detailed description to be made in conjunction with the accompanying drawings.

DETAILED DESCRIPTION OF THE INVENTION

The following description will describe an embodiment according to the present invention with reference to the drawings.

Figure 1:
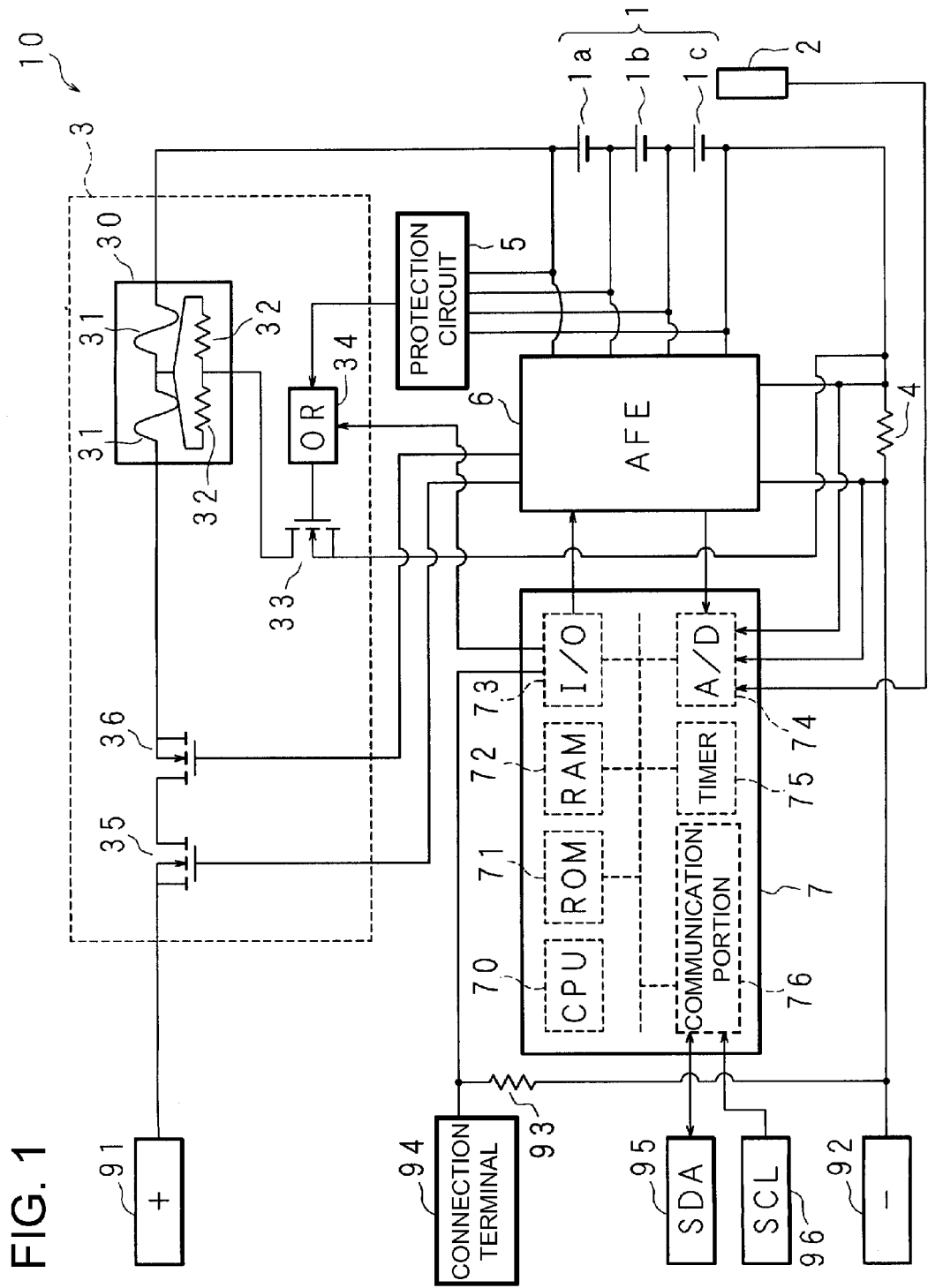
FIG. 1 is a block diagram showing the exemplary construction of a battery pack according to the present invention.

FIG. 1 is a block diagram showing the exemplary construction of a battery pack according to the present invention. As shown in this figure, a battery pack 10 includes a rechargeable battery 1, and a temperature sensor 2. The rechargeable battery 1 includes battery cells 1a, 1b, and 1c which are composed of lithium ion batteries, and are serially connected to each other in this order. The temperature sensor 2 detects the temperature of the rechargeable battery 1. The positive terminal of the battery cell 1a and the negative terminal of the battery cell 1c correspond to the positive terminal and negative terminal of the rechargeable battery 1, respectively. The rechargeable battery 1 may be other type of battery such as nickel metal hydride battery or nickel-cadmium battery. The number of the battery cells is not limited to three which compose the rechargeable battery 1. The rechargeable battery 1 may be composed of one, two, four, or more of battery cell(s).

The positive terminal of the rechargeable battery 1 is connected to a positive (+) terminal 91 through a cutoff portion 3 which cuts off charging/discharging current in the rechargeable battery 1. The negative terminal of the rechargeable battery 1 is connected to a negative (−) terminal 92 through a current detection resistor 4 which detects the charging/discharging current in the rechargeable battery 1. The battery pack 10 is removably mounted to an electric device (not shown) such as personal computer (PC) or mobile electronic device, and is connected to the electric device through the positive (+) terminal 91, the negative (−) terminal 92, and a battery connection terminal 94 which is connected to the negative (−) terminal 92 through a resistor 93. A charging/discharging path (hereinafter, occasionally referred to as charging path) corresponds to a path from the positive (+) terminal 91 through the cutoff portion 3, the rechargeable battery 1, and the current detection resistor 4 to the negative (−) terminal 92.

The cutoff portion 3 includes a series circuit of N-channel MOSFETs (switching devices) 35 and 36, and a non-return cutoff device 30. The N-channel MOSFETs (switching devices) 35 and 36 switch ON/OFF of discharging current and charging current in the rechargeable battery 1, respectively. The non-return cutoff device 30 includes fuses 31 and 31 which are serially connected to each other between two terminals. This series circuit is connected between the positive terminal of the rechargeable battery 1, and the positive (+) terminal 91. Other switching devices such as transistors may be used instead of the MOSFETs 35 and 36. The gates of MOSFETs 35 and 36 are provided with ON signals of H (high) level from a later-discussed AFE 6 when the rechargeable battery is discharged/charged. A parallel circuit of heating resistors 32 and 32 is connected between the fuse-connection point and an additional terminal of the non-return cutoff device 30, which is other than connection terminals of the non-return cutoff device 30 connected to the fuses 31 and 31. The fuse-connection point is a connection point between the fuses 31 and 31.

In addition, the cutoff portion 3 includes an N-channel MOSFET 33, and an OR circuit 34. The drain of the N-channel MOSFET 33 is connected to the additional terminal of the non-return cutoff device 30. The output terminal of the OR circuit 34 is connected to the gate of the MOSFET 33. The source of the MOSFET 33 is connected to the negative terminal of the rechargeable battery 1. When the output terminal of the OR circuit 34 is brought H (high) level, the drain and the source of the MOSFET 33 are electrically connected to each other so that the heating resistors 32 and 32 are applied through the fuses 31 and 31 with the voltage of the rechargeable battery 1 and/or voltage from an external source. Thus, the fuses 31 and 31 can be disconnected with heat. As a result, the charging/discharging path is irreversibly cut off. A device for cutting off the charging/discharging path in the non-return cutoff device 30 is not limited to the fuses 31 and 31.

The both ends of the battery cells 1a, 1b and 1c are connected to input terminals of a protection circuit 5, and to input terminals of an analog front end (hereinafter, occasionally referred to as AFE) 6. The protection circuit 5 provides a detection signal to the OR circuit 34, if detecting that any of the battery cells is brought into an over-voltage state. The AFE 6 selectively provides a control portion 7 of microcomputer with the cell voltages of the battery cells 1a, 1b and 1c from one after another. Additional input terminals of the AFE 6 are connected to the both ends of the current detection resistor 4.

The protection circuit 5 includes comparators and timers (not shown) corresponding to the battery cells 1a, 1b, and 1c. Each of the comparators compares the cell voltage of corresponding one of the battery cells 1a, 1b, and 1c with a reference voltage. The reference voltage is 4.3 V in this embodiment. However, the reference voltage is not limited to this value. If any of the cell voltages of the battery cells 1a, 1b, and 1c becomes higher than 4.3 V, corresponding one of the comparators provides a signal for activating corresponding one of the timers to start counting time. When the time counted by the timer reaches 1.5 seconds, it is detected that the rechargeable battery 1 is brought into the over-voltage state so that the detection signal indicating over-voltage state is provided to one of the input terminals of the OR circuit 34. Accordingly, the fuses 31 and 31 of the cutoff portion 3 can be disconnected with heat. As a result, the charging/discharging path of the rechargeable battery 1 is disconnected.

The AFE 6 includes a comparator (not shown). If the AFE 6 detects that over-current flows in the rechargeable battery 1 based on the comparison result of the voltage between the both ends of the current detection resistor 4 with and reference voltage, the AFE 6 provides OFF signals of L (low) level to the MOSFETs 35 and 36. As a result, the charging/discharging current is cut off. The AFE 6 also provides the OFF signals to the MOSFETs 35 and 36, if being provided with a detection signal of over-voltage state from an I/O Port 73.

The control portion 7 includes a CPU 70. The CPU 70 is connected to a ROM 71, a RAM 72, the I/O Port 73, an ND convertor 74, a timer 75, and a communication portion 76 through a bus. The ROM 71 stores information including the program, and the like. The RAM 72 temporarily stores created information. The I/O Port 73 provides the detection signal of over-voltage state to the other of the input terminals of the OR circuit 34 and the AFE 6, and is provided with the voltage of the battery connection terminal 94. The A/D convertor 74 converts an analog voltage into a digital voltage value. The timer 75 counts time. The communication portion 76 communicates with an external electric device.

The A/D convertor 74 is provided with the cell voltage of one of the battery cells 1a, 1b and 1c through the AFE 6, the voltage provided from the temperature sensor 2, and the voltage between the both ends of the current detection resistor 4. The A/D convertor 74 converts the provided analog voltages into digital voltage values.

The communication portion 76 is connected to a serial-data (SDA) terminal 95 and a serial clock (SCL) terminal 96. Data is transmitted/received through the SDA terminal 95 between the communication portion 76 and the external electric device. The communication portion 76 receives a clock signal through the SCL terminal 96. The communication portion 76 can communicate with the external electric device in another communication manner.

A charge stop point detecting device according to the present invention corresponds to the aforementioned construction of the battery pack 10 except the rechargeable battery 1, the temperature sensor 2, the cutoff portion 3, the protection circuit 5, and the resistor 93.

The CPU 70 executes processing including calculation, input/output, and the like based on the control program previously stored in the ROM 71. For example, the CPU 70 sequentially obtains the voltage values of the current detection resistor 4 through the A/D convertor 74. The CPU 70 integrates charging/discharging current values calculated based on the obtained voltage values, and adds (subtracts) the integrated charged/discharged capacity value of the rechargeable battery 1 to (from) the remaining capacity of the rechargeable battery 1. The CPU 70 thus obtains remaining capacity data. The thus-obtained remaining capacity data is transmitted to the external electric device through the communication portion 76. In addition, the CPU 70 sequentially obtains the voltage values of the temperature sensor 2 through the ND convertor 74, for example periodically at 250 ms, and detects the battery temperature values based on the obtained voltage values.

The CPU 70 also sequentially detects the cell voltage values of the battery cells 1a, 1b, and 1c provided to the A/D convertor 74 from the AFE 6 periodically at 250 ms. The CPU 70 stores the highest cell voltage among the detected cell voltage values in the RAM 72. The voltage detection period is not limited to 250 ms.

In this embodiment, in the charging operation, when the highest cell voltage value exceeds a full-charge detection start voltage value (corresponding to a predetermined voltage in claim 2), and when the charging current keeps lower than a threshold current value (predetermined current) of full-charge detection for a predetermined period of time, the CPU 70 sets a full-charge detection flag to 1. Thus, the point for stropping charging the rechargeable battery 1 (first point) is detected. The CPU 70 subtracts the discharged capacity value from the charged capacity value after the highest cell voltage value exceeds an integration start voltage value (corresponding to a predetermined voltage in claim 1), and calculates the charged/discharged capacity separately from the calculation of the remaining capacity value. If the charged/discharged capacity value exceeds 50% (predetermined capacity) of designed capacity value (alternatively, rated capacity, initial capacity or learning capacity; hereinafter, simply referred to as designed capacity), the CPU 70 sets the full-charge detection flag to 1. Thus, the point for stropping charging the rechargeable battery 1 (second point) is determined. When any of the first and second points is detected, the CPU 70 stops charging the rechargeable battery 1.

In the case where the rechargeable battery 1 is charged in the constant-current/constant-voltage charging manner, the first point will be first detected in order to accurately detect that the rechargeable battery 1 is fully-charged. The second point is detected in order to ensure the safety of the rechargeable battery 1 even if the first point cannot be determined for some reason. To achieve this, the threshold of the detection of the second point is adjusted to detect the second point soon after the rechargeable battery 1 is actually brought into the fully charged state.

Figure 2:
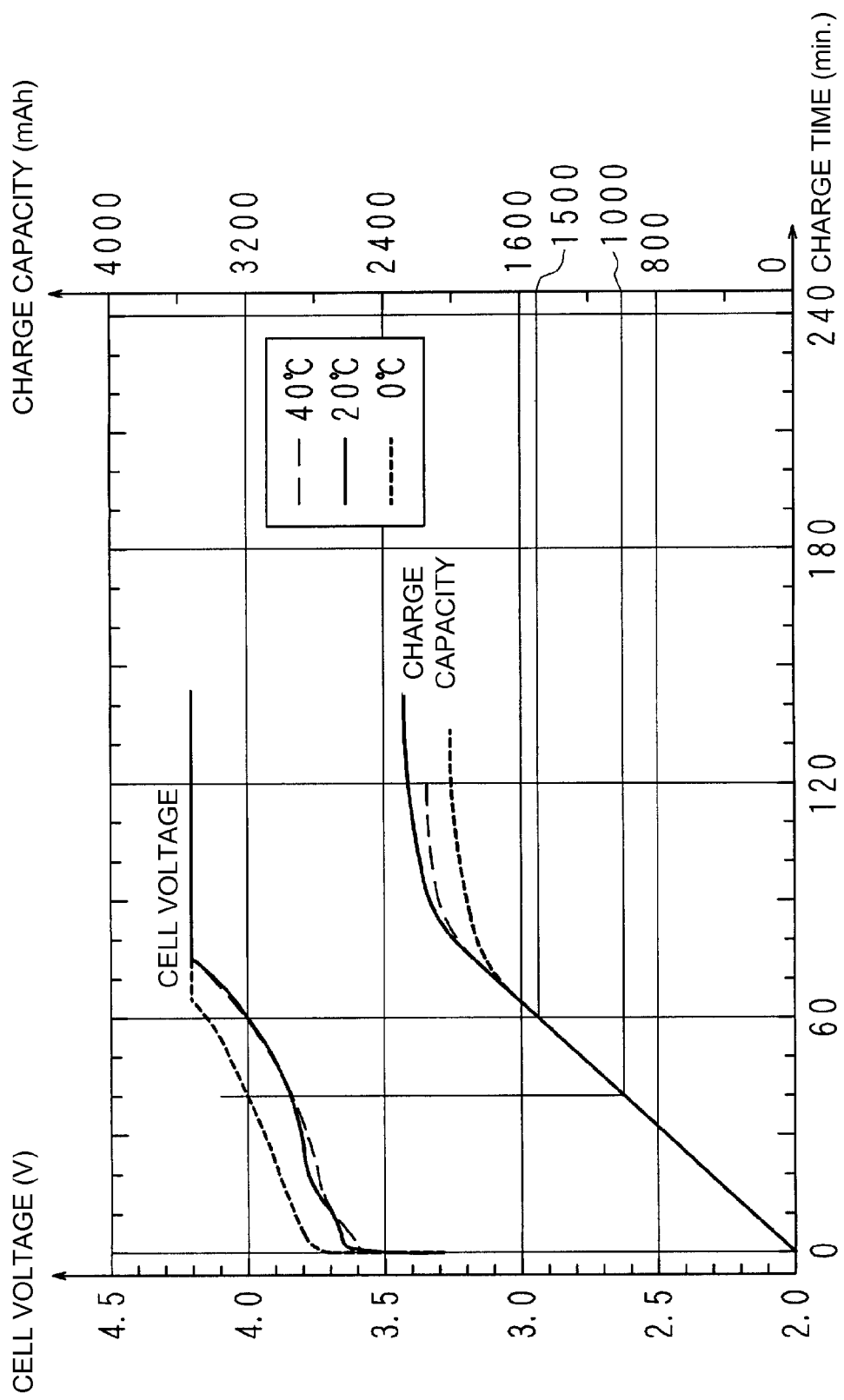
FIG. 2 is a graph showing characteristics of the cell voltage and the charge capacity of representative (average) single cell of battery cells relative to charge time.

FIG. 2 is a graph showing characteristics of the cell voltage and the charge capacity of representative (average) single cell of battery cells 1a, 1b, and 1c relative to charge time. In this graph, the horizontal axis indicates the charging time (minute), while the vertical axis indicates the cell voltage (V) and the charged capacity (mAh) of one of the battery cells 1a, 1b, and 1c. In this graph, the solid line, the long dashed line, and the short dashed line show the characteristics of one of the battery cells 1a, 1b, or 1c which has designed capacity of about 2250 mAh and is charged with constant current (1.5 A) and constant voltage (4.2 V) at cell temperatures of is 20°, 40°, and 0° C., respectively.

Although not illustrated in FIG. 2, the charging current will keep decreasing along a line corresponding to a convex function after a point when the cell voltage roughly reaches charging voltage (here 4.2 V). Accordingly, when the cell voltage exceeds 4.0V (predetermined voltage=full-charge detection start voltage), for example, and when the charging current keeps lower than 50 mA (predetermined current) for 20 seconds (predetermined time), for example, the CPU 70 sets the full-charge detection flag to 1. Thus, it can be detected that the rechargeable battery 1 is fully charged. The charging voltage and the full-charge detection start voltage can be suitably set in accordance with the type and specification of the rechargeable battery 1 to be used.

The detection of the second point is now described. According to the graph of FIG. 2, in the cases where the cell temperatures of 20° and 40° C., a charged capacity value can be read 1500 mAh when the cell voltage reaches 4.0 V which is the full-charge detection start voltage for detecting the first point. Again, the designed capacity of each of the battery cells 1a, 1b, and 1c is 2250 mAh. Accordingly, this charged capacity value means that the rechargeable battery is charged about 67% (1500/2250×100 (as a percentage)) relative to the designed capacity (corresponding to the initial FCC (in other words, the rechargeable battery is new)). This means that the rechargeable battery will be brought into the fully charged state when being additionally charged with 33% of the designed capacity after the cell voltage reaches 4.0 V. In this embodiment, the second point is detected as a point when the rechargeable battery is additionally charged with 40% of the designed capacity in order to allow for a 7% margin of error.

The rechargeable battery 1 will deteriorate with the number of charging/discharging cycles. Correspondingly, the FCC will decrease from the designed capacity with the number of charging/discharging cycles. Accordingly, will increase with the deterioration of FCC is the amount of capacity to be additionally charged until the second point is detected. For this reason, the second point is less likely to be detected prior to the first point even in the case where the number of charging/discharging cycles is increased.

Also, according to the graph of FIG. 2, in the cases where the cell temperature of 0° C., a charged capacity value can be read 1000 mAh when the cell voltage reaches 4.0 V. Accordingly, this charged capacity value means that the rechargeable battery is charged about 44% (1000/2250×100 (as a percentage)) relative to the designed capacity. This means that the rechargeable battery 1 will be brought into the fully charged state when being additionally charged with 56% of the designed capacity. In this embodiment, the second point is detected as a point when the rechargeable battery is additionally charged with 60% of the designed capacity in order to allow for a 4% margin of error.

According to these cases, if the detection is weighted on low-temperature use, the second point may be defined as a point when the rechargeable battery is additionally charged with 60% of the designed capacity after the cell voltage reaches 4.0 V (full-charge detection start voltage). In the case where the rechargeable battery is used in a range from semi-low temperature to semi-high temperature, it is suitable that the second point is defined as a point when the rechargeable battery is additionally charged with 50% (predetermined capacity) of the designed capacity, which is an intermediate value between 40% and 60%, after the cell voltage reaches 4.0 V.

The operation of the aforementioned control portion 7 of the battery pack 10 is now described with reference to flowcharts showing this operation. The following sequences are performed by the CPU 70 based on the control program which is previously stored in the ROM 71.

Figure 3:
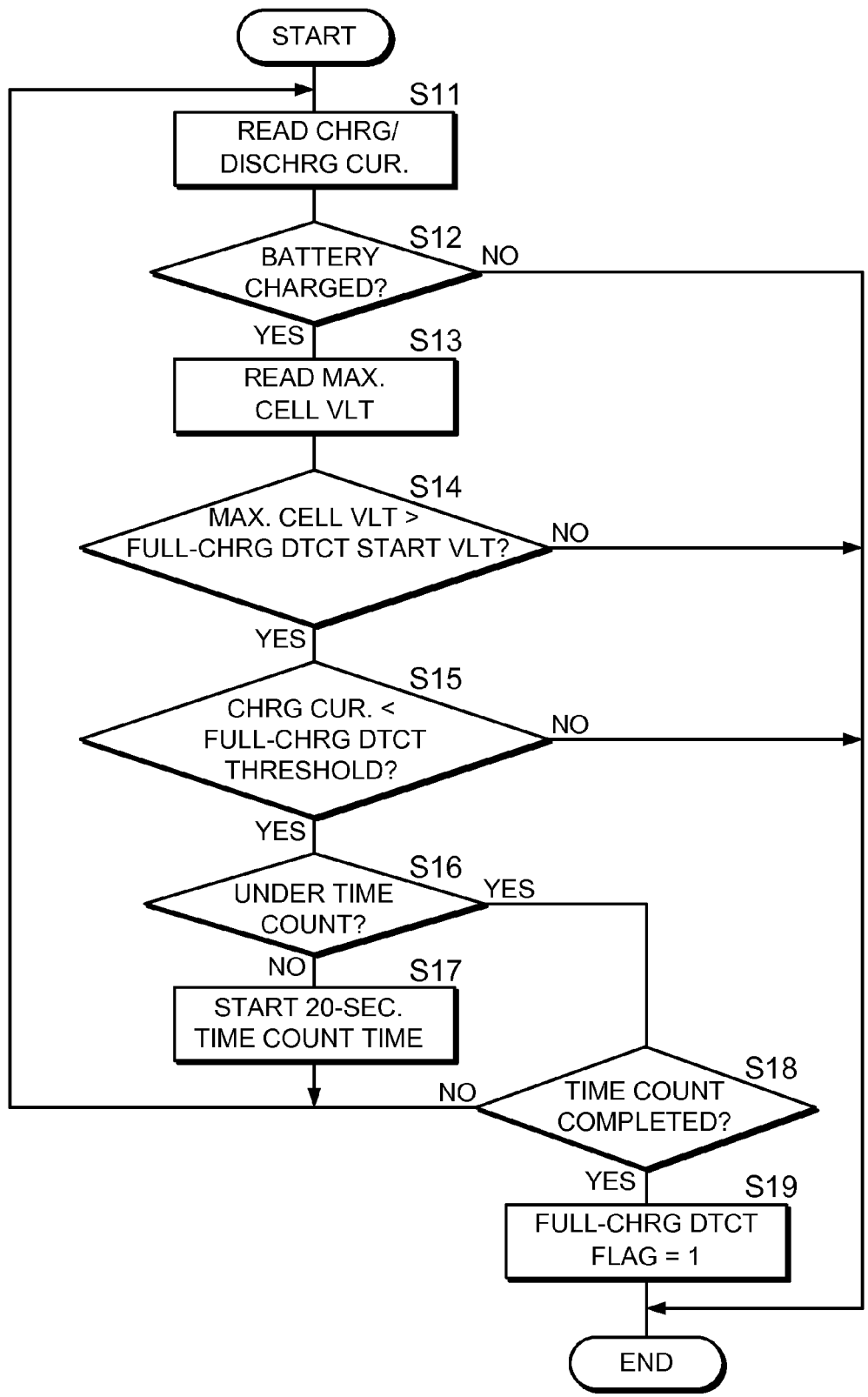
FIG. 3 is a flowchart showing the sequence of a CPU for detecting a first point.
Figure 4:
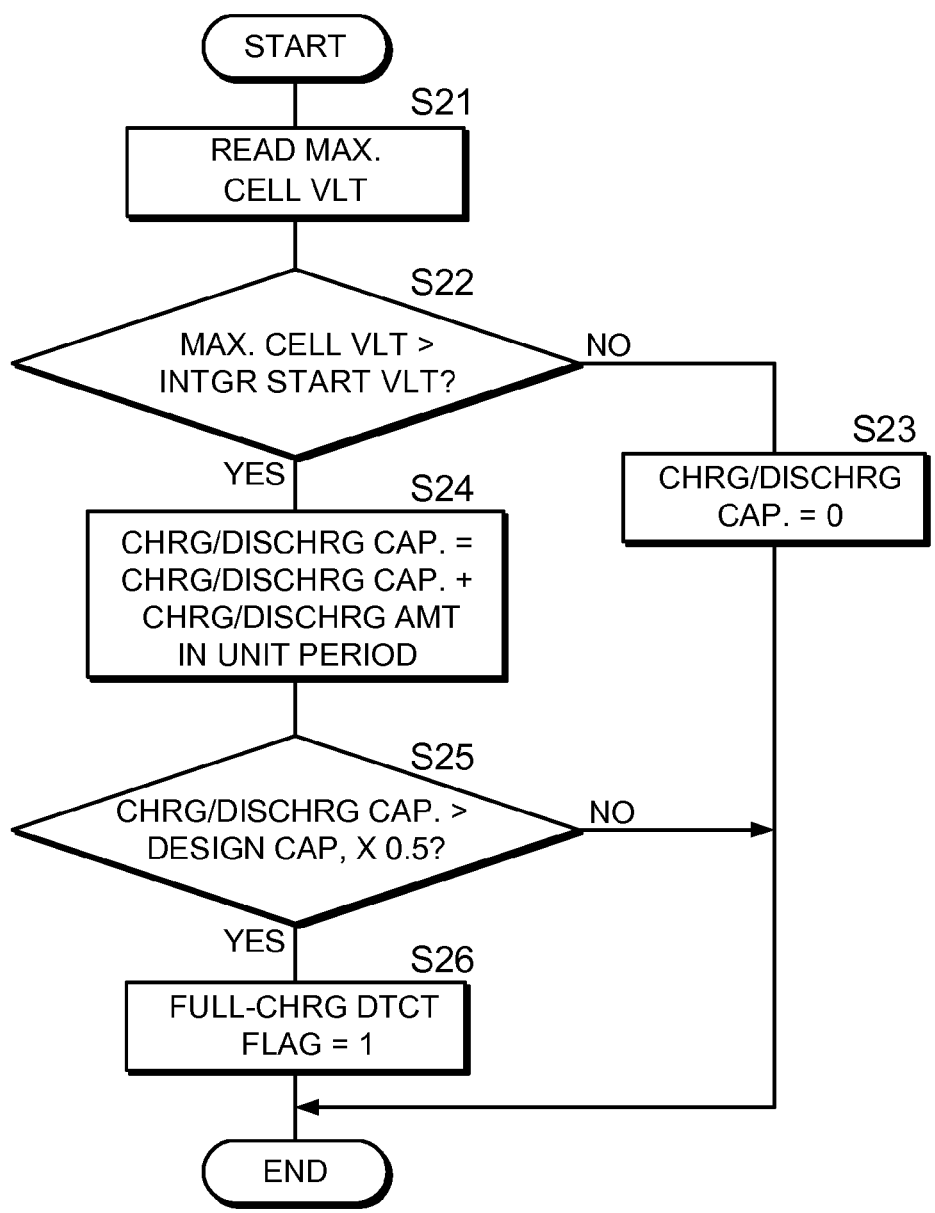
FIG. 4 is a flowchart showing the sequence of the CPU for detecting a second point.

FIG. 3 is one of the flowcharts showing the sequence of the CPU 70 for detecting the first point. FIG. 4 is another of the flowcharts showing the sequence of the CPU 70 for detecting the second point. The sequences shown in FIGS. 3 and 4 start every 250 ms. However, the cycle of the sequences is not limited to this period. The highest cell voltage is read from the RAM 72 in the sequences shown in FIGS. 3 and 4. This highest cell voltage to be read is written periodically at 250 ms into the RAM 72.

When the sequence shown in FIG. 3 starts, the CPU 70 obtains the charging/discharging current which is converted into the digital value by the ND convertor 74 (S11). The CPU 70 determines based on the polarity of the obtained charging/discharging current whether the rechargeable battery 1 is charged (S12). If the rechargeable battery 1 is not charged (S12: NO), the CPU 70 ends the sequence of FIG. 3. If the rechargeable battery 1 is not charged (S12: YES), the CPU 70 reads the highest cell voltage from the RAM 72 (S13). The CPU 70 determines whether the read highest cell voltage is higher than the full-charge detection start voltage (4.0 V in this embodiment) (S14). If the read highest cell voltage is not higher than the full-charge detection start voltage (S14: NO), the CPU 70 ends the sequence of FIG. 3.

If the read highest cell voltage is higher than the full-charge detection start voltage (S14: YES), the CPU 70 determines whether the charging/discharging current obtained in this charging operation (i.e., the charging current) is smaller than the full-charge detection threshold (50 mA in this embodiment) (S15). If the obtained charging current is not smaller than the threshold (S15: NO), the CPU 70 ends the sequence of FIG. 3. If the charging current is smaller than the aforementioned threshold (S15: YES), the CPU 70 determines whether the timer 75 to be used in this sequence is in operation for counting time (S16). If the timer 75 is not in operation for counting time (S16: NO), the timer 75 starts counting time up to 20 seconds (S17), and the sequence returns to Step S11.

If the timer 75 is in operation for counting time (S16: YES), the CPU 70 determines whether the timer 75 finishes counting time for 20 seconds (S18). If the timer 75 does not finish counting time for 20 seconds (S18: NO), the sequence returns to Step S11. If the timer 75 have finished counting time for 20 seconds (S18: YES), the CPU 70 sets the full-charge detection flag to 1 so that the RAM 72 stores the full-charge detection flag of 1 (S19). After that, the CPU 70 ends the sequence of FIG. 3.

The sequence of FIG. 4 is now described. The charged/discharged amount to be read in the sequence of FIG. 4 is a capacity value which is obtained by subtracting a discharged capacity value from a charged capacity value of the rechargeable battery 1 within a period of 250 ms. The charged/discharged amount to be read in the sequence of FIG. 4 is calculated in another sequence (not shown), and is stored in the RAM 72.

When the sequence shown in FIG. 4 starts, the CPU 70 reads the highest cell voltage from the RAM 72 (S21). The CPU 70 determines whether the read highest cell voltage is higher than the integration start voltage (e.g., 4.0 V) (S22). If the read highest cell voltage is not higher than the integration start voltage (S22: NO), the CPU 70 clears the "charged/discharged capacity", in other words, the CPU 70 resets the "charged/discharged capacity" to zero (S23). The "charged/discharged capacity" of zero is stored in the RAM 72. Accordingly, the "charged/discharged capacity" is initialized (reset to zero) periodically at 250 ms until the highest cell voltage exceeds the integration start voltage. After that, the CPU 70 ends the sequence of FIG. 4.

If the highest cell voltage is higher than the integration start voltage (S22: YES), the CPU 70 adds a charged/discharged amount value which is charged/discharged in a unit period to the "charged/discharged capacity" (S24). Subsequently, the CPU 70 determines whether the "charged/discharged capacity" after this addition of the charged/discharged amount is larger than 0.5 time (50%) the designed capacity (S25). If this "charged/discharged capacity" is not larger than 0.5 time (50%) the designed capacity (S25: NO), the CPU 70 ends the sequence of FIG. 4. In Step S25, in the case where this "charged/discharged capacity" is a negative value (if the rechargeable battery is discharged totally in the unit period), in this case, it is also determined that the "charged/discharged capacity" is not larger than 0.5 time (50%) the designed capacity (S25: NO). If the "charged/discharged capacity" is larger than 0.5 time (50%) the designed capacity (S25: YES), the CPU 70 sets the full-charge detection flag to 1 so that the RAM 72 stores the full-charge detection flag of 1 (S26). After that, the CPU 70 ends the sequence of FIG. 4.

In the sequence of FIG. 4, charged capacity for charging the rechargeable battery 1 is defined as positive capacity. Accordingly, if the "charged/discharged capacity" is a positive capacity value, this "charged/discharged capacity" means that the rechargeable battery is totally charged. However, discharged capacity for discharging the rechargeable battery 1 may be defined as positive capacity value. In this definition, if a "charged/discharged capacity" is a positive capacity value, this "charged/discharged capacity" means that the rechargeable battery is totally discharged. Accordingly, the CPU will determine whether the absolute value of the "charged/discharged capacity" is larger than 0.5 time (50%) the designed capacity in Step S25 in FIG. 4.

Moreover, although the integration start voltage is set to 4.0 V, which is same as the full-charge detection start voltage in the sequence of FIG. 4. However, the integration start voltage is not limited to this. For example, the integration start voltage may be set to voltage which is shifted from the full-charge detection start voltage by about ±0.1 V. Also, in this case, a similar effect can be provided. Again the CPU starts integrating the "charged/discharged capacity" at the integration start voltage. In the case where the integration start voltage is set higher, a highest cell voltage value at the integration start voltage is correspondingly higher. In other words, it can be said that, at the integration start voltage, the rechargeable battery 1 is brought to a state closer to the fully charged state. Accordingly, the predetermined capacity from the detection of the second point can be set smaller. As a result, the delay time can be reduced which is time from the first point to the second point.

As discussed above, in this embodiment, the highest cell voltage is detected periodically at 250 ms. After the highest cell voltage becomes higher than 4.0 V, for example, the charged capacity value and the discharged capacity value are added and subtracted for integrating the charged/discharged capacity. When the integration result shows that the rechargeable battery is totally charged after the highest cell voltage becomes higher than 4.0 V, and when the absolute value of the integration result becomes larger than the predetermined capacity, the point is detected for stopping charging the rechargeable battery.

That is, this capacity integration does not start until the highest cell voltage reaches 4.0 V. If the highest cell voltage keeps higher than 4.0 V, the integrated capacity is obtained by subtracting the discharged capacity from the charged capacity. When the integrated capacity becomes higher than the predetermined capacity, the point is detected for stopping charging the rechargeable battery. Thus, the point can be accurately detected for stopping charging the rechargeable battery irrespective of the capacity which is charged until the highest cell voltage reaches 4.0 V.

As a result, even if the calculated charged capacity or the calculated remaining capacity is different from the actual charged capacity or the actual remaining capacity, the point can be adequately detected for stopping charging the rechargeable battery.

In addition, after the highest cell voltage becomes higher than the full-charge detection start voltage (4.0 V), if the charging current keeps lower than 50 mA for 20 seconds or more, the first point is detected for stopping charging the rechargeable battery. Also, if the highest cell voltage keeps higher than the integration start voltage (4.0 V), the charged capacity value and the discharged capacity value are added and subtracted for integrating the charged/discharged capacity. When this integration result shows that the rechargeable battery is totally charged, and when the absolute value of the integration result becomes larger than the predetermined capacity, the second point is detected for stopping charging the rechargeable battery.

That is, after the highest cell voltage reaches the integration start voltage equivalent to the full-charge detection start voltage, the integrated capacity is obtained by subtracting the discharged capacity from the charged capacity. When the integrated capacity becomes higher than the predetermined capacity, the second point is detected for stopping charging the rechargeable battery.

As a result, the second point for stopping charging the rechargeable battery can be detected irrespective of the capacity which is charged until the rechargeable battery is brought to a state near the fully charged state. Therefore, it is possible to improve the accuracy for detecting the second point. In addition, even if the first point cannot be detected for some reason, the second point can be detected so that it is possible to stop charging the rechargeable battery.

Also, the predetermined capacity is set to 50% of the designed capacity which is previously specified as the total capacity available to charge the rechargeable battery.

Therefore, it is possible to detect the second point for stopping charging the rechargeable battery independent of variable capacity such as learning capacity.

The predetermined capacity may be adjusted lower/higher within the range of 40% to 60% of the designed capacity in accordance with higher/lower temperature to be expected in use of the rechargeable battery.

In this case, the predetermined capacity may be suitably set based on whether the rechargeable battery in used in a range of ordinary temperature to higher temperature, or a lower temperature range.

Also, the charge stop point detecting device can detect the point for stopping charging the rechargeable battery.

Accordingly, the battery pack can be provided with the charge stop point detecting device which can adequately detect the point for stopping charging the rechargeable battery, even if the calculated charged capacity or the calculated remaining capacity is different from the actual charged capacity or the actual remaining capacity.

In this embodiment, where the additionally charged capacity (predetermined capacity) is defined as capacity with which the rechargeable battery is charged until the second point is detected after the cell voltage reaches 4.0 V (full-charge detection start voltage), the additionally charged capacity (predetermined capacity) can be set within the range of 40% to 60% of the designed capacity. In the flowchart, the additionally charged capacity is set to 50% of the designed capacity. However, the additionally charged capacity is not limited to this. For example, the additionally charged capacity may be adjusted lower or higher based on whether the detected cell temperature is higher or lower.

It should be apparent to those with an ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the scope of the invention as defined in the appended claims. The present application is based on Application No. 2011-096,284 filed in Japan on Apr. 22, 2011, the content of which is incorporated herein by reference.

What is claimed is:
1. A charge stop point detecting method comprising:
    detecting, using a hardware processor, voltage, charging current and discharging current of a rechargeable battery at predetermined intervals on a time-series basis;

detecting a first point for stopping charging of the rechargeable battery when the detected voltage is higher than a predetermined voltage and the detected charging current is smaller than a predetermined current during a predetermined time;

integrating charged capacity and discharged capacity based on the detected charging current and the detected discharging current, to obtain an integrated capacity;

detecting a second point for stopping charging of the rechargeable battery, which is different from the first point, based on the integrated capacity; and deciding to stop charging the rechargeable battery when any of the first and second points is detected, wherein if the detected voltage is not higher than voltage for detecting the first point, the charged capacity and the discharged capacity are reset to zero, if the detected voltage is higher than voltage for detecting the first point and indicates that the rechargeable battery is fully charged, the charged capacity and the discharged capacity is integrated by subtracting the charged capacity and the discharged capacity if the detected voltage is kept higher than the voltage for detecting the first point, to obtain the integrated capacity, and if the integration result shows that the rechargeable battery is fully charged, it is determined whether the integrated capacity is greater than predetermined capacity, and wherein the second point is detected when the integrated capacity becomes greater than the predetermined capacity.

2. The charge stop point detecting method according to claim 1, wherein the predetermined capacity is previously set at a predetermined ratio relative to a total capacity available to charge the rechargeable battery.

3. The charge stop point detecting method according to claim 2, wherein the predetermined ratio falls within the range of 40% to 60%.

4. A charge stop point detecting device comprising:
a non-transitory memory storing a program; and
a hardware processor that executes the program and causes the charge stop point detecting device to operate as:
an integrating portion that integrates charged capacity and discharged capacity of a rechargeable battery based on charging current and discharging current of the rechargeable battery that are sequentially detected;
a deciding portion that decides points for stopping charging of the rechargeable battery based on the charged capacity and discharged capacity integrated by the integrating portion; and
a detecting portion that detects the voltage of the rechargeable battery at predetermined intervals on a time-series basis,
wherein if the voltage detected by the detecting portion is not higher than a predetermined voltage, the integrating portion resets the charged capacity and the discharged capacity to zero, if the voltage detected by the detecting portion is higher than the predetermined voltage, the integrating portion determines an integrated capacity of the rechargeable battery based on the charged capacity and the discharged capacity if the detected voltage is kept higher than the predetermined voltage, and wherein the charge stop point detecting device further comprising a determining portion that, if the integration result obtained by the integrating portion indicates that the rechargeable battery is fully charged, determines whether the integrated capacity is greater than a predetermined capacity, wherein the detecting portion detects the voltage, charging current and discharging current of the rechargeable battery at the predetermined intervals on a time-series basis, the integrating portion detects a first point for stopping charging of the rechargeable battery when the detected voltage detected by the detecting portion is higher than a predetermined voltage and the detected charging current detected by the detecting portion is smaller than a predetermined current during a predetermined time, and integrates charged capacity and discharged capacity based on the detected charging current and the detected discharging current, the deciding portion detects a second point for stopping charging of the rechargeable battery, which is different from the first point, based on the integrated capacity integrated by the integrating portion, and decides to stop charging the rechargeable battery when any of the first and second points is detected, and wherein if the detected voltage detected by the detecting portion is higher than a voltage for detecting the first point and indicates that the rechargeable battery is fully charged, the integrating portion determines the integrated capacity by subtracting the charged capacity and the discharged capacity if the detected voltage is kept higher than the predetermined voltage.

5. The charge stop point detecting device according to claim 4, wherein the predetermined capacity is previously set at a predetermined ratio relative to the total capacity available to charge a rechargeable battery.

6. The charge stop point detecting device according to claim 5, wherein the predetermined ratio falls within the range of 40% to 60%.

7. A battery pack comprising the charge stop point detecting device according to claim 4, and one rechargeable battery or a plurality of rechargeable batteries to stop being charged when the point for stopping charging the rechargeable battery or batteries is detected by the charge stop point detecting device.

* * * * *